Feb. 20, 1934.   D. A. ROSSI   1,948,050
VEHICLE DIRECTION SIGNAL
Filed May 17, 1932   2 Sheets-Sheet 1
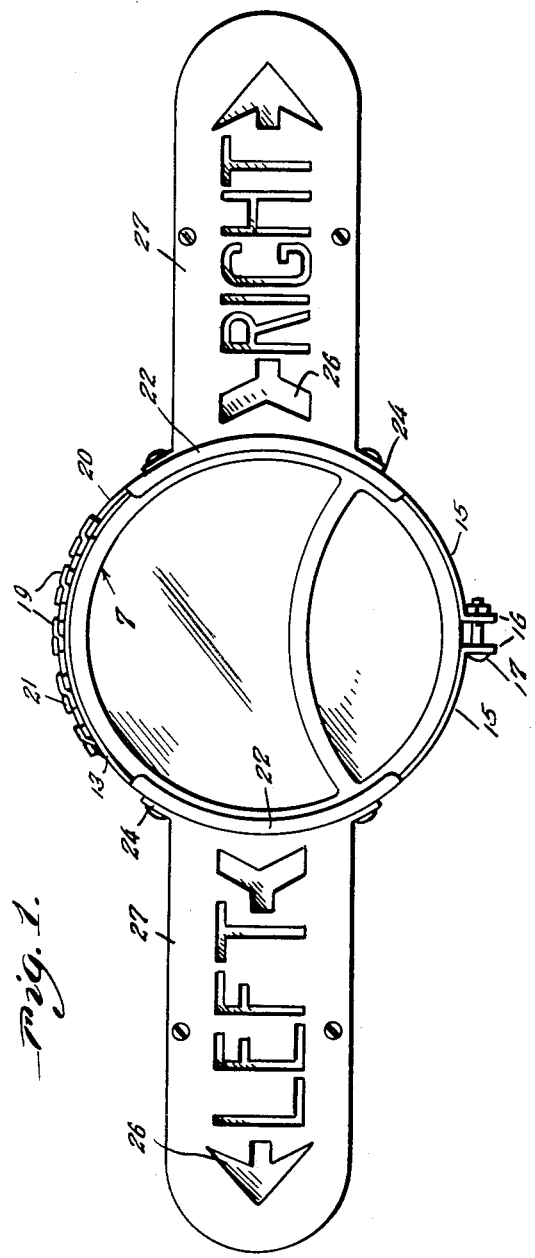
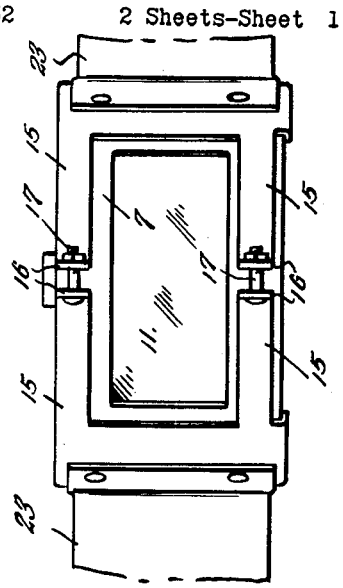
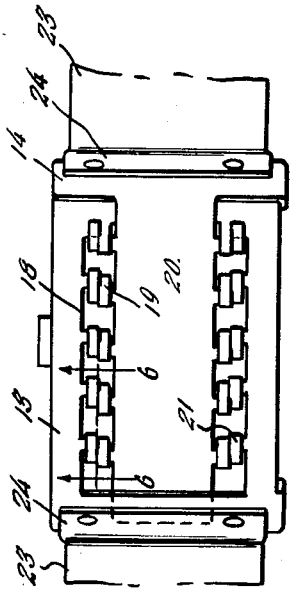
Inventor
Domenic A. Rossi
By Clarence A. O'Brien
Attorney Feb. 20, 1934.  D. A. ROSSI  1,948,050
VEHICLE DIRECTION SIGNAL
Filed May 17, 1932   2 Sheets-Sheet 2
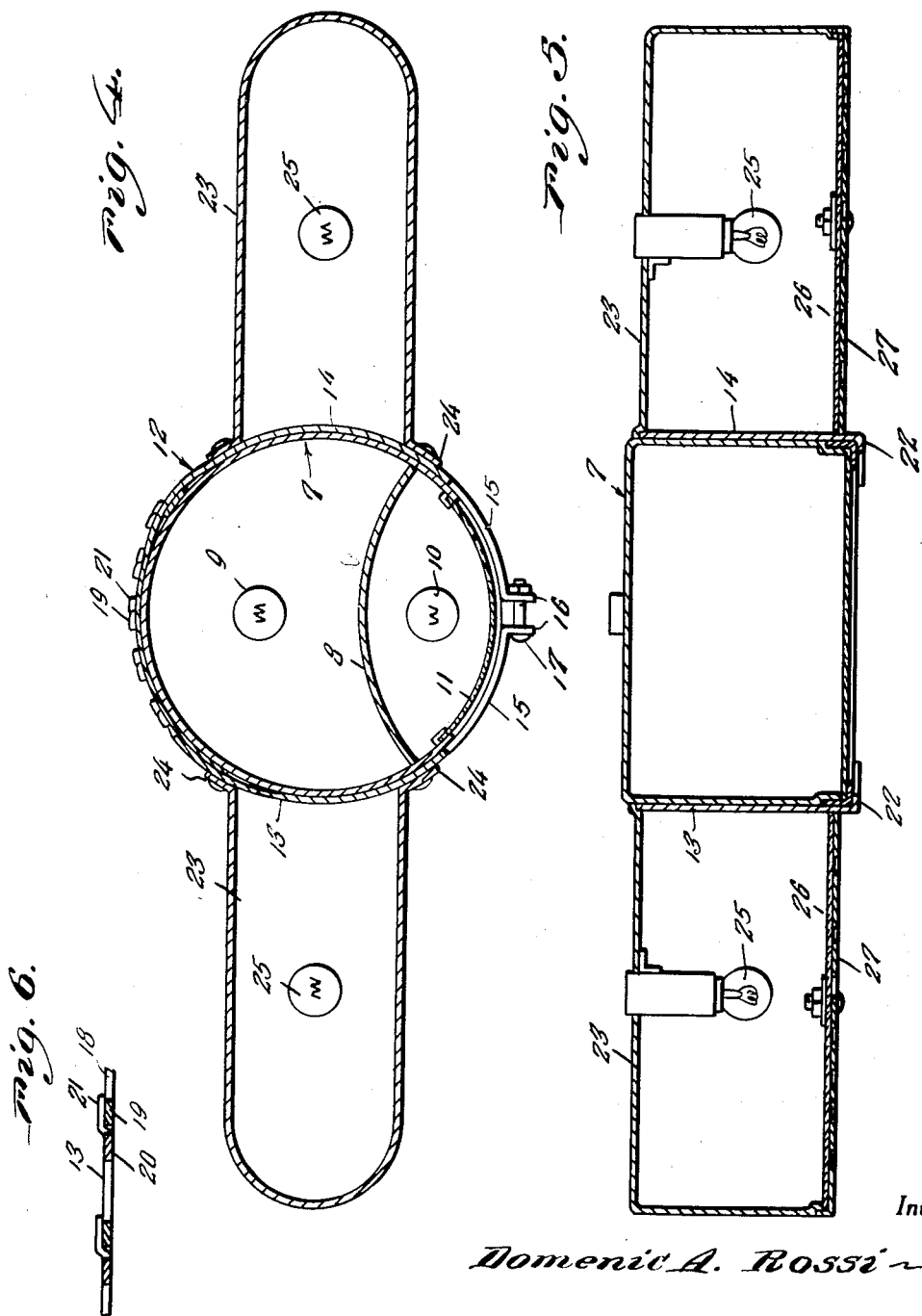
Inventor
Domenic A. Rossi
By Clarence A. O'Brien
Attorney Patented Feb. 20, 1934

1,948,050

UNITED STATES PATENT OFFICE 1,948,050

VEHICLE DIRECTION SIGNAL

Domenic A. Rossi, Springfield, Mass.

Application May 17, 1932. Serial No. 611,912

1 Claim. (Cl. 177—329)

This invention relates to the broad class of motor vehicle direction signals and has more specific reference to a novel attachment for a conventional tail light which attachment is applicable to said tail light without requiring alterations in the existing parts thereof, whereby to permit the tail light to function as is usual and at the same time utilize the casing or housing of said light as the supporting means for the auxiliary direction indicating signalling attachment.

Briefly stated, the attachment comprises a two part clamp adapted to embrace the casing of the tail light, the complemental or companion parts of said clamp being provided with oppositely extending illuminated indicators constructed to provide clearly visible means usable for indicating left and right turns.

The principal novelty is predicated upon the specific construction of the attachment per se which has been developed with a view toward promoting efficiency in operation and application as well as simplicity in construction and economy in assembling.

Other features and advantages will become more readily apparent from the following description and drawings.

In the drawings:

Figure 1 is a rear elevational view of a conventional marketed type of tail light showing the improved attachment applied thereto.

Figure 2 is a top plan view showing the interlocking means forming the crown portion of the tail light embracing clamp.

Figure 3 is a bottom plan view of the clamp showing how it is made to prevent obscuring the license plate window in the bottom of the tail light casing.

Figure 4 is a longitudinal sectional view of Figure 1.

Figure 5 is a horizontal section taken centrally through Figure 1.

Figure 6 is a detail sectional view taken on the plane of the line 6—6 of Figure 2.

Referring now to the illustration of the invention detailed in the drawings, and especially to Figure 4, it will be observed that the numeral 7 designates the usual tail-light. In practice, these tail lights vary in shape, size and proportions, and it is the idea of the invention to provide clamping means which will conform to the casing of the light irrespective of its particular configuration.

As a general rule however, these tail light casings are of circular form and the clamping means of the attachment correspond in general shape in order to conform nicely thereto. Incidently the tail light casing is divided by a partition 8 into upper and lower compartments containing the distinguishable bulbs 9 and 10 which function in the customary way. Moreover, the bottom of the rim of the casing is provided with the customary transparent window or panel 11 through which the rays from the bulb 10 pass for illuminating the license plate (not shown).

The clamping means of the attachment is generally represented by the numeral 12 and comprises a pair of substantially semi-circular bands 13 and 14 respectively, connected together in the manner shown to completely embrace the rim of the tail light casing. The lower end portions of the band are formed with relatively narrow strap extensions 15 having laterally directed apertures extremities 16 to accommodate a binding bolt 17.

These straps when brought together define a rectangular opening surrounding the panel 15 as seen better in Figure 3 so as not to obscure the light rays passing through this panel. The upper end portions of the clamping bands are constructed as shown in Figure 2, the end of the band 13 having a slot 18 formed with longitudinally spaced marginal L-shaped hooks whose bills 19 are offset slightly as shown.

The corresponding ends of the band section 14 is formed with a tongue 20 which extends into the slot and which is provided along its opposite longitudinal edges with correspondingly shaped L-shaped hooks having offset end portions 21. The respective sets or groups of hooks are separably and adjustably joined together in interlocking relation as depicted in Figure 2, thereby making the crown portion of the clamp adjustable for fitting different sizes of tail light casings.

The intermediate portions of the rear edges of the bands 13 and 14 are provided with arcuate laterally bent abutment flanges 22 which as seen in Figure 1 bear against the adjacent portion of the rim of the tail light casing to hold the clamp more securely in place.

Referring now to Figure 4 it will be observed that the numerals 23 designate longitudinally elongated indicator casings having their flanged inner ends 24 riveted or otherwise secured to the central portions of the bands 13 and 14. Each casing is provided with an individual electric lamp 25 and the open face thereof is provided with a suitably colored translucent lens or glass plate 26 and a co-operating stencilled cover plate 27.

The respective plates of the casing 23 are cut to provide the requisite inscription and indicating means for left and right turns as shown in the drawings. Thus it will be seen that the two semi-circular clamping bands have their adjacent ends adjustably connected together so as to securely embrace the tail light casing, each band provided with its individual illuminated indicator properly constructed for accurately denoting the intentional movement of the vehicle carrying this attachment.

Particular emphasis is placed on the quick separable end portions defining the crown connection of the clamp in that one band end is slotted and the complemental band end formed with a slip tongue for co-operation with the slot, together with the offset interlocking hook members constituting the means for joining said band-ends together. This arrangement permits the clamping means to conform snugly to the tail light casing for accurate fitting of the clamping device on casings of different diameters and shapes.

Likewise, I wish to emphasize the lower strap end connections joining the lower ends of the bands 13 and 14 together in such a manner as to provide for further adjustment and designed so as not to obscure the light rays passing through the panel 11.

It is thought that the description taken in connection with the drawings will enable a clear understanding of the invention to be had. Therefore, a more lengthy description is thought unnecessary. While the preferred embodiment of the invention has been shown and described, it is to be understood that minor changes coming within the field of invention claimed may be resorted to if desired.

I claim:

In a structure of the class described, in combination, a vehicle tail light comprising a casing having a circular rim portion, a clamp embracing the rim portion of said casing and embodying a pair of substantially semi-circular sections, means for adjustably connecting the lower ends of said clamp sections, means for adjustably connecting the upper end of said clamp sections, a direction indicator attached to the outer side of each clamp section, said direction indicators being disposed on opposite sides of the tail light in alignment with each other on a horizontal plane passing through the tail light, and means for securely attaching said indicators to said clamp sections.

DOMENIC A. ROSSI.